June 22, 1926.
T. B. HOGG
1,589,758
COMBINED INTAKE AND EXHAUST MANIFOLD
Filed Feb. 15, 1924
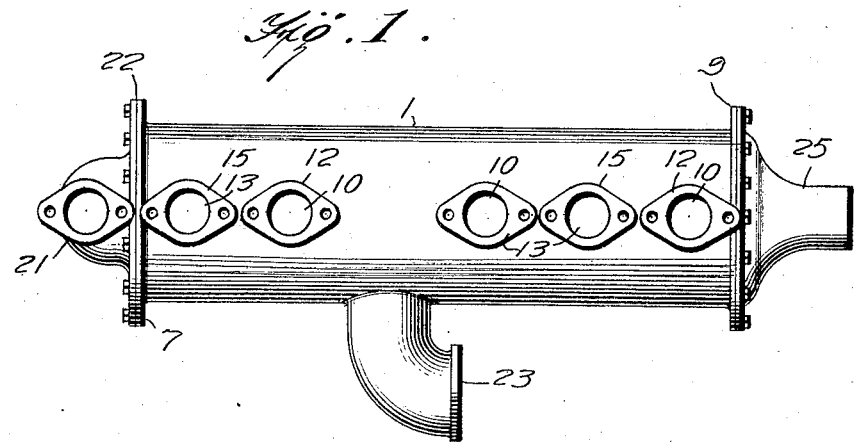
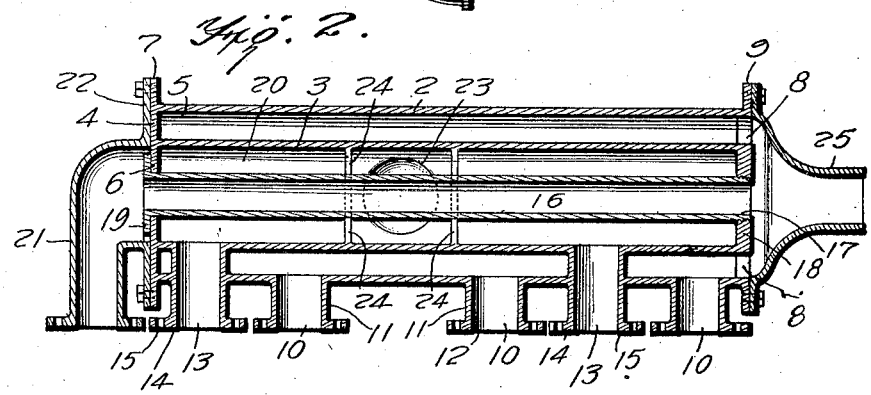
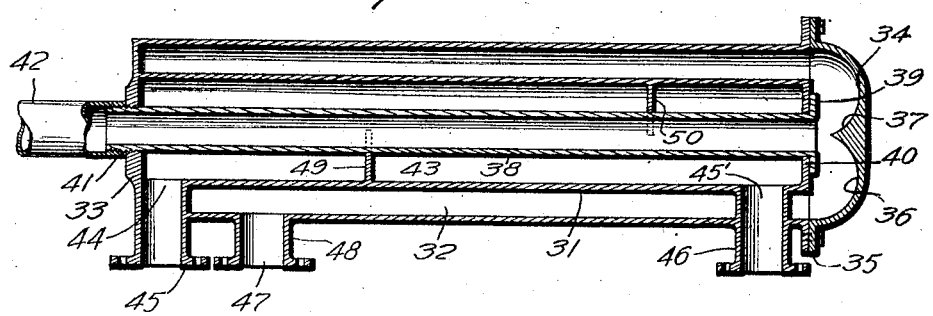
Inventor
T. B. HOGG,
By
Attorney Patented June 22, 1926.

1,589,758

UNITED STATES PATENT OFFICE.

THEODORE B. HOGG, OF DAYTON, OHIO.

COMBINED INTAKE AND EXHAUST MANIFOLD.

Application filed February 15, 1924. Serial No. 693,082.

This invention relates to an improvement in combined intake and exhaust manifolds of that type adapted to be connected to an explosive engine in a manner to permit the exhaust gases from the engine to flow through the vaporizer and heat the same, to thereby insure proper vaporization of the incoming fuel mixture.

Vaporizers of this type have been heretofore proposed, but generally, the exhaust gases are caused to circulate through the vaporizer in a manner tending to a decrease in the efficiency of the engine through a retarded flow of the exhaust gases. The present invention therefore is directed particularly in the preferred form to providing a vaporizer having a circulating space for the incoming fuel mixture, and also having spaces for the passage of the exhaust gases on both sides of the space for the fuel mixture. To secure the desired and uniform vaporization of the fuel mixture in the fuel mixture space, these independent exhaust gas spaces are each directly connected with the exhaust gas outlets from the engine, so that the fuel mixture space is heated on both sides with the full heat of the exhaust gases.

A further object of the invention is the provision of a particular form of baffle, whereby the fuel mixture is compelled to travel a more or less tortuous passage between the inlet to the vaporizer and the outlet therefrom, to secure more effective vaporization.

The invention is illustrated in the accompanying drawings, in which:

Fig. 1 is a view in elevation of the preferred form of vaporizer.

Fig. 2 is a horizontal longitudinal section of the same.

Fig. 3 is a longitudinal section of a slightly modified form of vaporizer.

The improved vaporizer, as shown more particularly in Figs. 1 and 2, comprises a casting 1, including spaced concentric tubular portions 2 and 3, connected at what will be termed the inlet end of the vaporizer by an annular plate 4 closing the space 5 between the outer and inner tubes 2 and 3, this plate 4 extending inwardly of the inner tube 3 as at 6, and outwardly of the outer tube 2 as at 7. The opposite end of the casting is provided with webs 8 to maintain the spacing between the inner and outer tubes without affecting the outlet, and the outer tube 2 at this end is preferably provided with an outstanding flange 9.

The outer tube 2 is formed in one portion of its wall with longitudinally aligned openings 10, having conduit extensions 11, terminally formed with flanges 12, whereby the vaporizer as a whole may be secured to the engine, with the openings 10 communicating with the exhaust ports of the engine.

The vaporizer here shown is designed for a four cylinder engine, and it is to be particularly noted that there are but three exhaust gas openings 10 formed integral with the vaporizer casting.

The inner tube 3 of the casting is formed with fuel mixture outlet openings 13, having conduit extensions 14 which bridge the space 5 and extend through the outer tube 2, these conduit extensions having terminal flanges 15 to connect with the fuel mixture inlets to the engine block.

An inner tube 16 is arranged within and concentric with the tube 3 of the casting, said inner or central tube 16 being open at both ends and being threaded at one end as at 17 to cooperate with a threaded thickened portion 18 of the inner tube 3 of the casting. The opposite end of the central tube has a hexagonal flange 19, adapted when the tube is in place to overlie the flange projection 6 or the end wall 4 of the casting and thereby seal the space 20 between the central tube and the inner tube 3. As thus arranged, the central tube is readily removable.

An exhaust gas conduit 21 leads from the remaining exhaust port of the engine to the inlet end of the vaporizer and is formed with a flange 22 by which this independent exhaust gas conduit 21 may be connected to the extension 7 of the end plate 4 of the vaporizer body, to cause the independent exhaust gas conduit 21 to communicate directly with the interior of the central tube 16.

A fuel mixture inlet 23, leading from a carbureter, (not shown) or other source of fuel mixture supply, opens through the outer tube 1 and inner tube 3 of the vaporizer body to thereby deliver the fuel mixture into the space 20 between the central tube 16 and the inner tube 3 of the vaporizer body. In order to insure that the incoming fuel mixture is afforded a proper contact with the heated walls of the vaporizer, baffles 24 are arranged on opposite sides of the fuel mixture inlet within the space 20. These baffles are in the form of semi-annular members, which are permanently secured to the inner surface of the inner wall 3 of the vaporizer body, and permanently close a portion of the space 20 against direct communication with the inlet 23, so that the incoming fuel mixture is prevented from flowing directly to the outlets 13, and is compelled to travel around the central pipe 16 before reaching such outlets.

The outlet end of the vaporizer is provided with a pipe section 25, removably secured to the flange 9 of the body, this pipe section being open to the outlet end of the space 5 and also to the central tube 16.

In this preferred form of vaporizer, it will be noted that the incoming fuel mixture is caused to circulate in the space 20 of the vaporizer body, and also that this space 20 is defined by the inner tube 3 of the body and the wall of the central tube 16. The inner tube 3 of the body is directly heated by the exhaust gases entering the openings 10, and the central tube 16 is also directly heated by the exhaust gases entering through the conduit 21. Thus no matter what the heat of the exhaust gases may be, the fuel mixture is subjected to this exact heat degree interiorly and exteriorly, and hence vaporization to the extent permitted by the degree of heat will take place throughout the volume of fuel mixture, and no one portion of such fuel mixture will be heated to a higher degree than other portions. This is a decided advantage over vaporizers of the type wherein the exhaust gases enter at one or more points, of the vaporizer, pass through a space interiorly or exteriorly of the fuel space and then return through the remaining space in circulation, as where the gases return in circulation there is a tendency to increase the resistance to the flow of such gases as to decrease the efficiency of the engine. This is substantially and practically avoided in the construction described in this particular.

In Fig. 3, I have shown a slightly modified form of vaporizer, wherein the vaporizer body or casting is formed to present inner and outer tubes 30 and 31, providing an exhaust space 32 between them, this space being closed at the outlet end of the vaporizer by a plate 33, and being, as a casting form, open at the inlet end of the vaporizer and adapted to be closed by a cap 34 having flange connection 35, with the body of the vaporizer. The cap is formed with an annular concavity 36 on its interior surface, forming a central directing point 37, the purpose of which will be later explained. A central tube 38 is arranged within and concentric with the inner tube 31, the central tube at the inlet end of the carbureter having a flange terminal 39 shaped as a nut for convenient turning of the tube, this flange terminal overlying and bearing in sealing cooperative relation against an inwardly extending flange 40 of the inner tube 31. The opposite end of the central tube 38 is threaded at 41 to cooperate with the threaded edge of the end plate 33 of the vaporizer body and the internally threaded exhaust gas outlet pipe 42. The application of the central tube provides a fuel mixture space 43 between said tube and the inner tube 31 of the vaporizer body.

The inner tube 31 of the vaporizer body is formed near the outlet end of the vaporizer with a fuel mixture inlet opening 44, having a conduit extension 45 which opens through and beyond the outer wall 30, and is adapted to be connected to the carbureter or other source of supply. The tube 31 is formed near the opposite or inlet end of the vaporizer with a fuel mixture outlet 45' having a conduit extension 46 leading to and through the outer tube 30, and adapted to connect the vaporizer and motor cylinder. The outer tube 30 of the vaporizer is formed with an inlet 47 for exhaust gases, having a conduit extension 48 adapted to be connected to the usual exhaust pipe of the engine, these exhaust gases circulating first in the space 32 and then entering the concaved channel in the cap and being directed by the wall of the same, which is particularly formed for the purpose into the central tube 38, and thence to the muffler or other escape. The spur 37 acts to direct this circulation positively into the central tube without material interfering with the flow of the gas. The fuel mixture inlet and outlets 44 and 45 communicate with the space 43, and to prevent direct travel of the fuel mixture lengthwise of this space, there are provided baffles 49 and 50. These baffles are substantially similar to the baffles described in connection with the preferred form, and are formed integral with or otherwise secured to the inner surface of the inner tube 31 of the body. The baffles are semi-circular in form and of a radial length to bridge the space 43. The baffles are arranged oppositely with respect to the central tube 38, that is, for example, one baffle will embrace the lower half of this tube while the other baffle will embrace the upper half of the tube. Thus the incoming fuel mixture is compelled to travel at least once around the tube 38 before reaching the outlet, and is thus effectively vaporized by the heat of the exhaust gases.

I claim:

1. A combined intake and exhaust manifold construction being formed to provide a fuel mixture space having a fuel mixture inlet and fuel mixture outlets, an exhaust gas space exteriorly of the fuel space and closed against the latter, an exhaust gas space arranged interiorly of the fuel mixture space and closed against the latter, and means for admitting the exhaust gases directly from the engine into each of said exhaust gas spaces independently.

2. A combined intake and exhaust manifold construction comprising a body having spaced concentric inner and outer tubes providing an exhaust gas space between them, a central tube arranged interiorly of and in spaced concentric relation with the inner tube and defining a fuel mixture space between itself and said inner tube, exhaust gas inlets leading to the exhaust gas space between the inner and outer tubes of the body, and an independent exhaust gas inlet leading directly to the central tube.

3. A combined intake and exhaust manifold construction comprising a body having inner and outer spaced concentric tubes, a central tube removably arranged within and spaced concentrically from the inner tube, means for independently admitting exhaust gases to the space between the inner and outer tubes of the body and to the space within the central tube, fuel mixture inlet and outlets communicating with the space between the central tube and inner tube, and baffles of semi-circular form secured to the inner tube and bridging the space throughout the length of the baffles between said inner tube and central tube.

In testimony whereof I affix my signature.

THEODORE B. HOGG. [L. S.]